United States Patent [19] … [11] Patent Number: 5,494,194
Topper et al. … [45] Date of Patent: Feb. 27, 1996

[54] VISCOUS MATERIAL DISPENSER

[75] Inventors: Robert T. Topper, Heber Springs; John W. Gilliom, Wooster; James M. Tucker, Conway, all of Ark.

[73] Assignee: White Consolidated Industries, Inc., Cleveland, Ohio

[21] Appl. No.: 166,236

[22] Filed: Dec. 10, 1993

[51] Int. Cl.$^6$ .................................................. B67D 5/62
[52] U.S. Cl. ........................ 222/146.6; 222/386; 417/553
[58] Field of Search ............................ 222/146.1, 146.6, 222/386, 383, 409, 491, 494, 504; 417/511, 545, 546, 552, 553; 92/181 P, 182

[56] References Cited

U.S. PATENT DOCUMENTS

| | | |
|---|---|---|
| 898,659 | 9/1808 | Kuehl . |
| 924,098 | 6/1909 | Neff et al. . |
| 1,153,816 | 9/1915 | Nichols . |
| 1,447,963 | 7/1921 | Coleman . |
| 1,449,534 | 3/1923 | Morgan . |
| 2,263,794 | 11/1941 | Wyen ............................... 222/146.6 X |
| 2,558,887 | 7/1951 | Tesiero ............................. 222/146.6 X |
| 2,559,840 | 7/1951 | Arthur . |
| 2,740,264 | 4/1956 | Thompson, Jr. ................. 222/146.6 X |
| 3,044,277 | 7/1962 | Barnum ............................ 222/146.6 X |
| 3,081,920 | 3/1963 | Gorychka et al. . |
| 3,213,903 | 10/1965 | Armstrong ....................... 222/146.6 X |
| 3,371,822 | 3/1968 | Galloway . |
| 3,435,996 | 4/1969 | Jones . |
| 3,489,099 | 1/1970 | Huffsmith, Sr. . |
| 3,494,512 | 2/1970 | Haynes . |
| 3,536,424 | 10/1970 | Plos . |
| 3,627,178 | 12/1971 | Sundholm . |
| 3,677,443 | 7/1972 | Smadar et al. . |
| 3,752,604 | 8/1973 | Dorn . |
| 3,807,604 | 4/1974 | Schaffer et al. ..................... 222/146.6 |
| 3,826,409 | 7/1974 | Chilcoate . |
| 4,045,976 | 9/1977 | Mills ................................ 222/146.6 X |
| 4,077,750 | 3/1978 | Hake . |
| 4,105,146 | 8/1978 | Broillard . |
| 4,118,152 | 10/1978 | Bron . |
| 4,213,545 | 7/1980 | Thompson et al. . |
| 4,231,492 | 11/1980 | Rios . |
| 4,231,547 | 11/1980 | Manfroni . |
| 4,452,823 | 6/1984 | Connolly et al. . |
| 4,577,783 | 3/1986 | Racca et al. . |
| 4,645,093 | 2/1987 | Jones ................................ 222/146.6 X |
| 4,664,298 | 5/1987 | Shew . |
| 4,707,997 | 11/1987 | Bigler et al. . |
| 4,711,376 | 12/1987 | Manfroni . |
| 4,723,688 | 2/1988 | Munoz . |
| 4,736,600 | 4/1988 | Brown ............................. 222/146.6 X |
| 4,742,941 | 5/1988 | Tastet . |
| 4,753,371 | 6/1988 | Michielin et al. . |
| 4,775,564 | 10/1988 | Shriver et al. . |
| 4,785,978 | 11/1988 | Kano et al. . |
| 5,016,446 | 5/1991 | Fiedler ............................ 222/146.6 X |

(List continued on next page.)

*Primary Examiner*—Andres Kashnikow
*Assistant Examiner*—Kenneth R. DeRosa
*Attorney, Agent, or Firm*—Pearne, Gordon, McCoy & Granger

[57] ABSTRACT

A reciprocating piston with an integral valve moves in a first direction within a cylinder to pressurize viscous material contained therein, such as ice cream or the like, thereby pushing it out of a dispensing nozzle located at one end of the cylinder while simultaneously extracting viscous material from a collapsible container into the other end of the cylinder by suctioning the material from the container. When the piston moves in a second direction, the integral valve opens to allow the piston to pass through the previously suctioned viscous material then within the cylinder. The dispensing nozzle includes a normally closed, spring-biased valve opened by the force of the pressurized material, closing of the valve being assisted by a transient suction force occurring as the valved piston begins to move in the second direction through the material. Suctioning the material from the collapsible container, as opposed to compressing the container to expel the material, is preferable when the material contains entrapped gas, as is the case with ice cream, since repeated compression of such containerized material can diminish its quality.

18 Claims, 11 Drawing Sheets

U.S. PATENT DOCUMENTS

| | | |
|---|---|---|
| 5,048,724 | 9/1991 | Thomas . |
| 5,060,826 | 10/1991 | Coleman . |
| 5,069,364 | 12/1991 | McGill . |
| 5,149,551 | 9/1992 | Anderson . |
| 5,150,820 | 9/1992 | McGill . |
| 5,178,304 | 1/1993 | Torterotot . |
| 5,197,638 | 3/1993 | Wood . |
| 5,215,222 | 6/1993 | McGill . |
| 5,244,277 | 9/1993 | Broussalian et al. . |
| 5,361,941 | 11/1994 | Parekh et al. ................... 222/146.6 X |

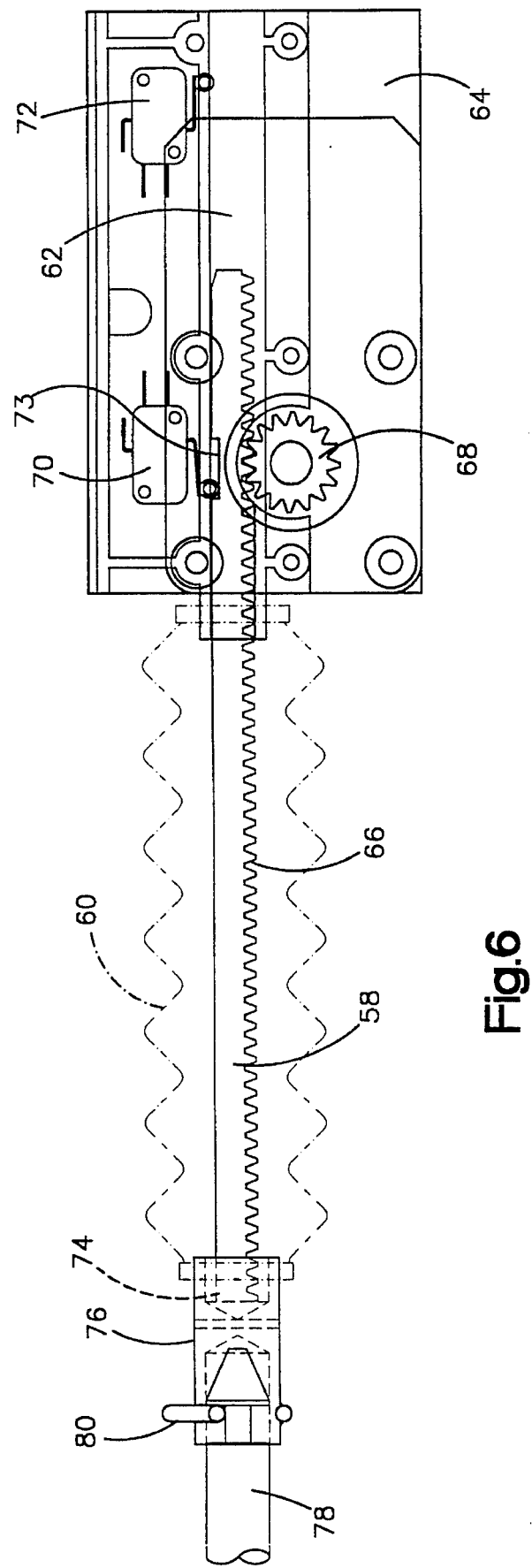

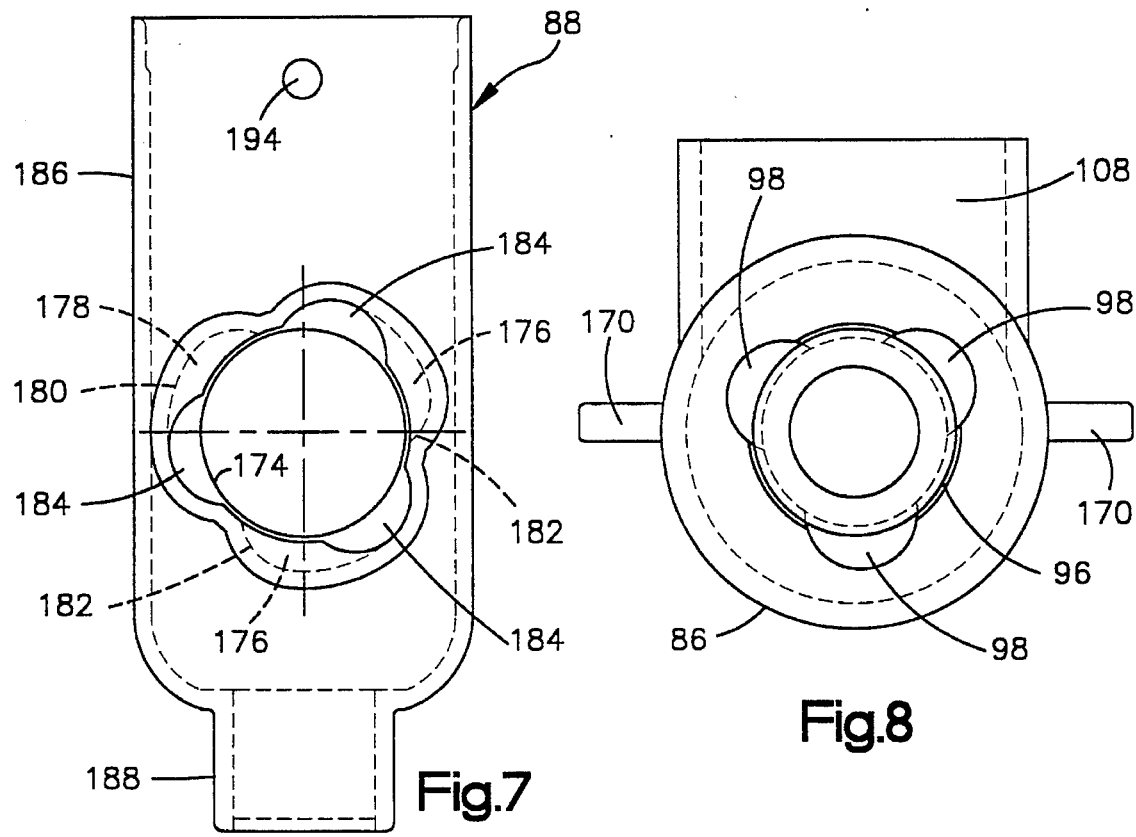
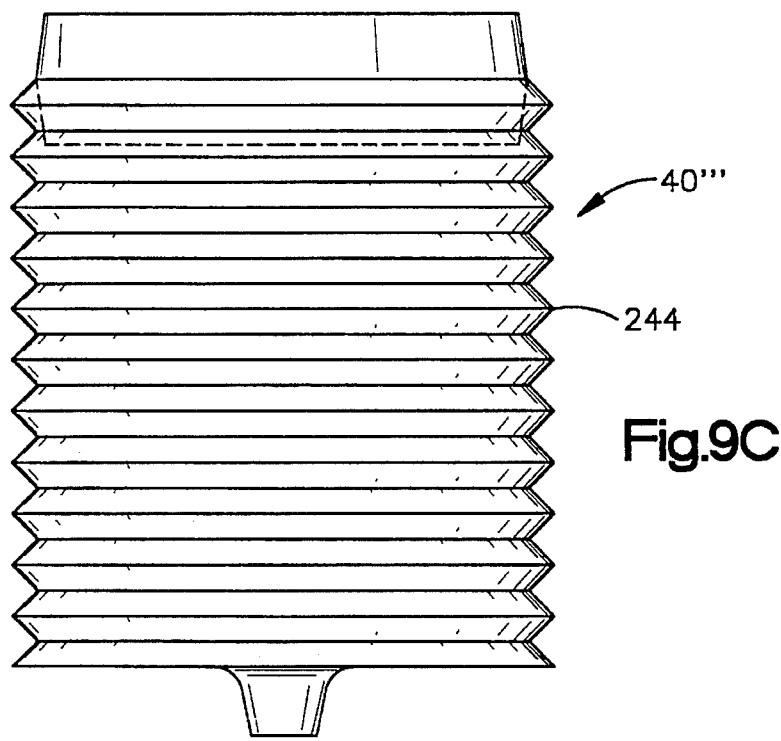

VISCOUS MATERIAL DISPENSER

BACKGROUND OF THE INVENTION

The present invention relates in general to devices and methods for dispensing flowable materials having high viscosities, and more particularly to the dispensing of soft serve frozen confections such as ice cream and the like.

A frozen confection, such as ice cream, frozen yogurt, sherbet, or sorbet, is termed "soft serve" when it is at a temperature within a range of approximately 10° to 20° F., for example 18° F., so as to have a viscosity that will enable it to flow through a dispensing nozzle into an edible cone or other suitable container whereupon the soft serve confection is immediately consumed. Traditionally, complex machines have been provided at retail outlets to manufacture, store and dispense soft serve frozen confections. The complexity of the machines makes them costly not only to acquire but also to maintain, both from an operational and a hygienic standpoint. Also, the quality of the soft serve confection is difficult to control due to variations in the ingredients loaded into the machine, and due to variations in the level of skill of the machine operators. Further, it is difficult to provide, at the retail level, a wide variety of types and flavors of soft serve frozen confections since the noted machines must each be dedicated to providing only a few types and flavors of confections at any given time, and since the number of machines per retail outlet is limited by cost and space considerations.

As an alternative to the above, it has been proposed that soft serve frozen confections be manufactured at a central facility, and then stored at the facility in portable containers at a low storage temperature of 0° F. or below. By use of a central manufacturing and storage facility, the cost and quality of the frozen confections could be more readily controlled. Also, an inventory of prefilled containers providing a wide range of types and flavors of frozen confections could be established. The containers could then be shipped on demand from inventory to retail outlets wherein they would be thawed or tempered to a "soft serve" temperature. The containerized soft serve frozen confections could then be dispensed at the retail outlet from a simpler and more compact machine that would only function as a dispenser and storage means.

Examples of dispensers for containerized soft serve confections are illustrated by U.S. Pat. Nos. 5,048,724, 5,069,364, 5,215,222, and 5,244,277, all of which are expressly incorporated herein. The noted patents disclose dispensers wherein collapsible or otherwise deformable containers are mechanically compressed to expel or extrude soft serve frozen confections therefrom for each individual serving. While the noted compression type soft serve dispensers arguably represent an advance in the art, it has been found that repeated compression of soft serve frozen confections, which can contain up to 40% air, may degrade the quality of the dispensed product. It is believed that repeated pressurization of the frozen confection within the container causes undesirable ice crystals to form within the confection, degrading the taste and texture of the dispensed confection. Although this effect is small or almost negligible for each pressurization/depressurization cycle, since the entire volume of confection within the containers of these patents is repeatedly pressurized the cumulative effect is substantial and noticeable.

Also, the discharge rate from the earlier noted patented devices, which mechanically compress the product, is highly dependent upon product viscosity and, therefore, product formulation and temperature. For example, high fat content chocolate ice cream having a relatively high viscosity may have to be dispensed at a higher "soft serve" temperature, or a higher pressure, than a lower viscosity sorbet.

It is therefore an object of the present invention to provide a dispenser for containerized frozen confections and the like of the soft serve type that can operate over a relatively wide "soft serve" temperature range wherein frozen confections at the same temperature, but of substantially different viscosities can be dispensed. It is a further object of the present invention to provide a dispenser that will eliminate repeated compression or pressurization of the frozen confection within the container, and minimize compression or pressurization of dispensed frozen confection, so as to avoid or at least minimize the above noted problems associated therewith. It is also an object of the invention to provide a dispenser that will dispense ice cream in controlled predetermined amounts for purposes of portion control. It is a further object of the invention to provide a delivery means including a dispensing valve which is operable to dispense viscous material with a minimum of compression or pressurization of the viscous material being dispensed therefrom.

It is to be noted that while the above background and subsequent description of the invention focus mainly on the dispensing of soft serve frozen confections, it is clearly contemplated by the inventors that the invention may have applications to the dispensing of other high viscous food products, such as prepared vegetables and nutritional supplements.

SUMMARY OF THE INVENTION

In accordance with the present invention, a dispenser for viscous material such as ice cream and the like preferably includes a supply source of viscous material constituted by a portable container for storing the viscous material. The dispenser also includes a delivery means for discharging the viscous material, and a pump means connected between the supply source and the delivery means to establish fluid communication therebetween.

The pump means includes a pump member which is reciprocally movable in two directions. When the pump member moves in the first of its two directions, it pressurizes the viscous material to thereby push the material toward the delivery means for discharge thereof and to simultaneously extract viscous material from the supply source by means of suction. The pump member is movable in the second or opposite of its two directions without causing substantial movement of the viscous material relative to the delivery means or the supply source.

In further accordance with the present invention, a dispenser is provided which is operable to dispense containerized frozen confections and the like of the soft-serve type over a relatively wide temperature and viscosity range. The dispenser utilizes a positive displacement pump that dispenses predetermined quantities of confection with minimal compression of the confection being dispensed, and eliminates compression of the confection in the container, thereby avoiding or at least minimizing the problems, e.g. ice crystal formation, present in the prior art dispensing methods.

In further accordance with the present invention, the delivery means includes a dispensing valve for discharging viscous material. The dispensing valve includes a valve body which provides an inlet port, an outlet port, and a chamber in fluid communication with said ports. The viscous material flows from the inlet port to the outlet port via the chamber when the valve is in an open condition.

The dispensing valve further comprises a poppet member contained within the valve body and movable between a closed position when seated and sealed against the outlet port, and an open position when unseated and spaced from said outlet port. When in the seated and sealed position, the poppet member precludes the flow of viscous material out of the outlet port. When in the open position, the poppet member permits the flow of viscous material out of the outlet port.

The poppet member provides a surface which is acted upon by the pressurized viscous material within said chamber. The dispensing valve also includes a biasing means, e.g. a compression spring, which biases the poppet member toward its closed position. The poppet member is movable to its open position against the bias force of the biasing means solely by viscous material pressure which is created by movement of the pump member in the first of its two directions. Movement of the poppet member to its closed position is a result of the combination of the biasing force and a transient reduced pressure condition or suction force developed within the chamber by the pump means during movement of the pump member in the second of its two direction.

BRIEF DESCRIPTION OF THE DRAWINGS

These and further features of the present invention will be apparent with reference to the following description and drawings, wherein:

FIG. 6 is a top plan view of a rack mounting block and rack according to the present invention;

FIG. 7 is a rear elevational view of a discharge cylinder of the delivery means according to the present invention;

FIG. 8 is a front elevational view of a conduit member of the dispensing pump according to the present invention;

FIG. 9C is a front elevational view of a further alternative portable container according to the present invention.

DETAILED DESCRIPTION OF THE PREFERRED EMBODIMENTS

Figure 1:
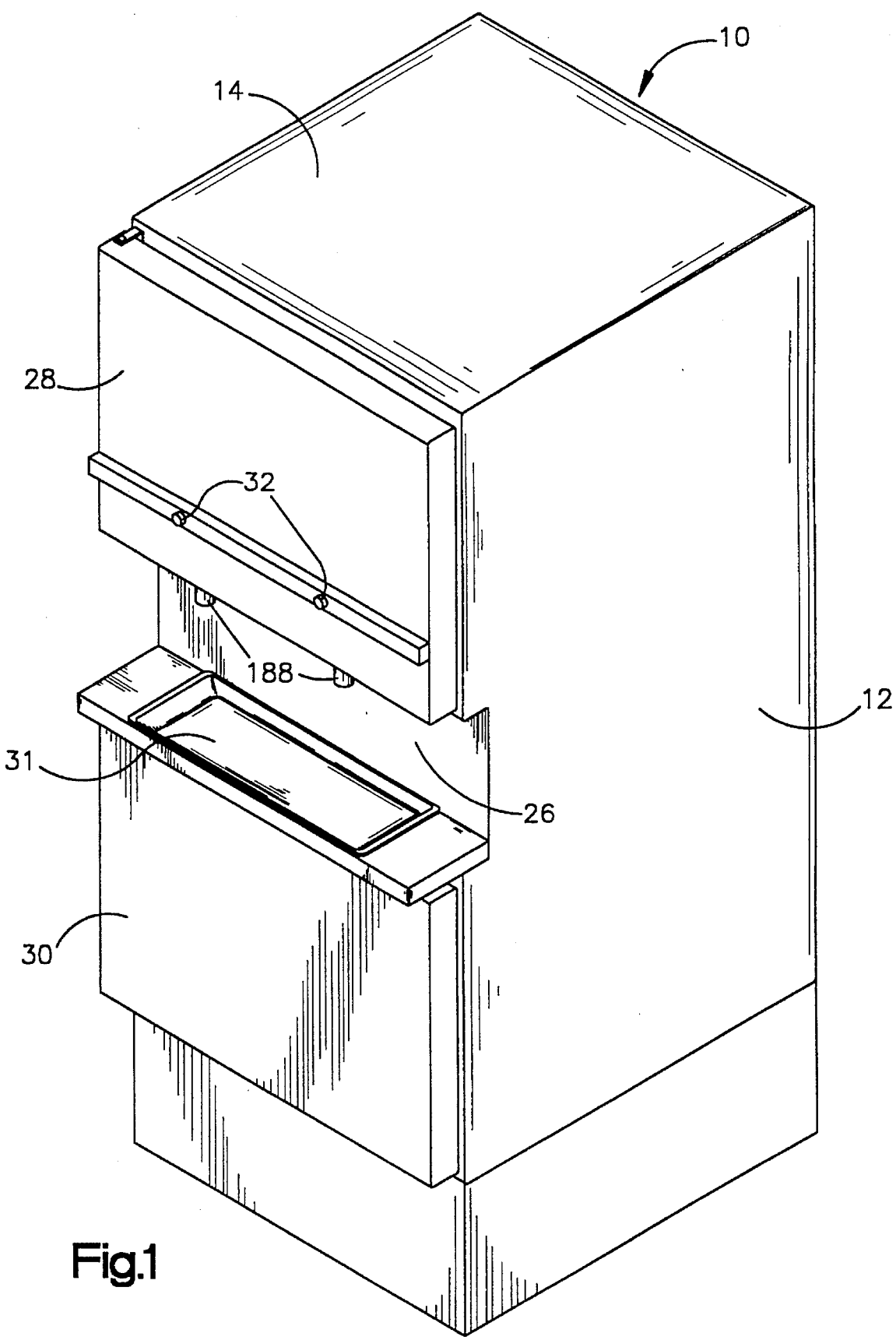
FIG. 1 is a front perspective view of a dispenser according to the present invention.
Figure 2:
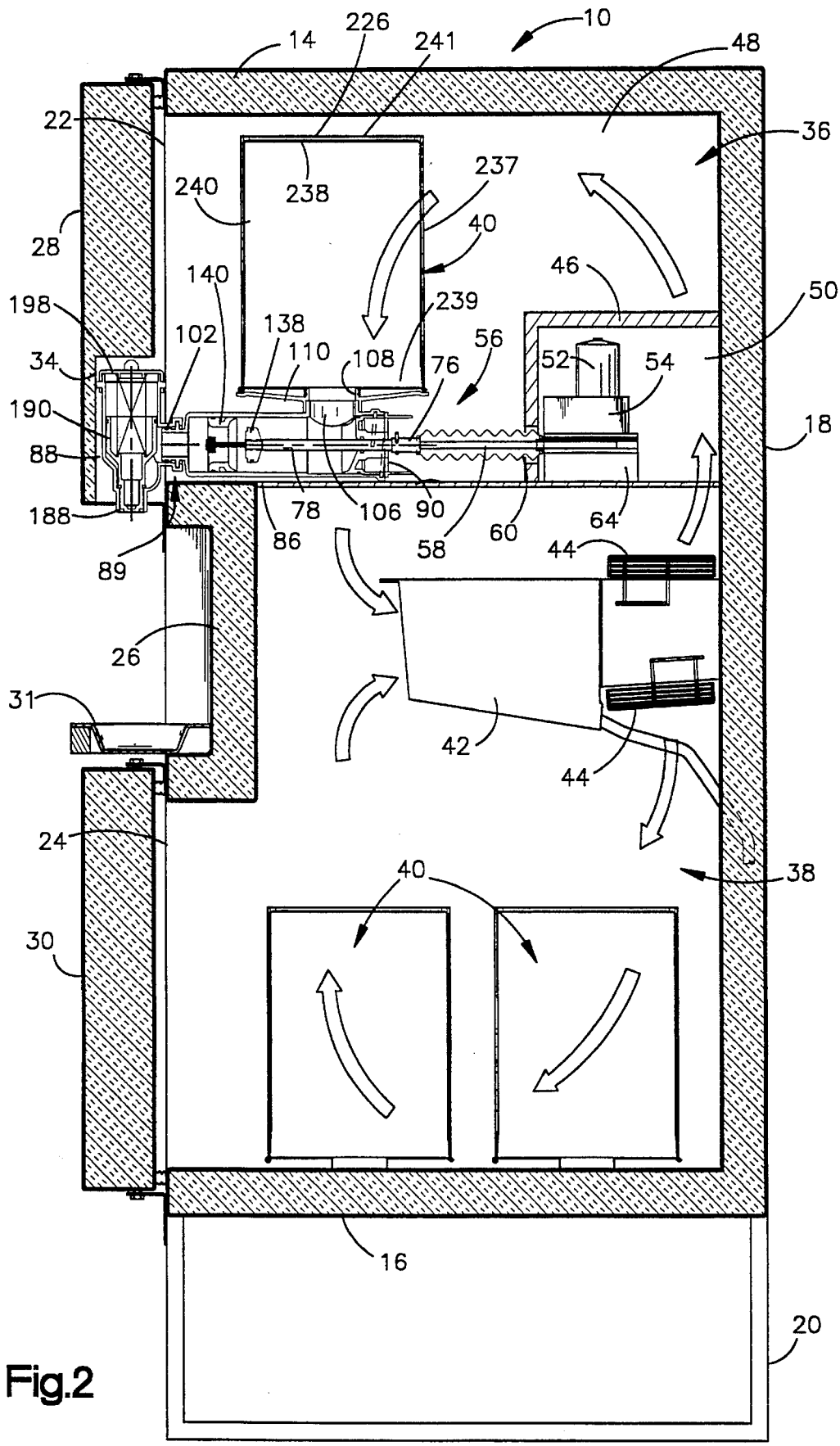
FIG. 2 is a side elevational view, in cross-section, of the dispenser of FIG. 1.

A dispenser according to the present invention is generally illustrated in FIGS. 1 and 2, and includes a thermally insulated dispensing cabinet 10 having opposed vertical side walls 12 (one shown), horizontal top and bottom walls 14 and 16, and a vertical rear wall 18. The bottom wall 16 is spaced from a supporting surface by a base member 20 which houses various components, such as a conventional refrigeration compressor (not shown) and a conventional condenser structure (not shown). A front portion of the cabinet 10 provides spaced upper and lower openings 22, 24 which are separated by an inset panel 26, the openings 22, 24 being closed by upper and lower doors 28, 30 which are preferably mounted for pivotal movement about their left edge using appropriate hinge structures, as illustrated most clearly in FIG. 1. A drip pan 31 is provided above the lower door 30 and is removably attached to the lower end of inset panel 26, as illustrated.

The upper door 28 provides control devices, such as push buttons 32 (one for each of the two dispensing pump means to be subsequently illustrated), to control dispensing of frozen confection, and one or more inside recesses or pockets 34 which receive and thermally insulate frozen confection delivery means, as will be described more fully hereafter. The panel 26, walls 12, 14, 16, and 18, and doors 28 and 30 of the dispensing cabinet 10 are thermally insulated to reduce the energy required to maintain the temperature provided in the interior of the cabinet, which is typically between about 10° to 20° F.

FIG. 2 shows that the interior of the dispensing cabinet 10 is generally divided into upper and lower compartments or sections 36 and 38. The lower section 38 serves as a storage and temperature conditioning (tempering) cabinet whereby the temperature of a plurality of portable containers 40 of frozen confection, which hold between about two to five gallons of frozen confection and are typically introduced into the tempering cabinet at a temperature of about 0° F. or below, slowly rises to a dispensing temperature of between about 10° to 20° F. over an extended period of time, generally between about twelve and thirty-six hours. After the frozen confection within a particular container 40 is tempered or brought to the dispensing temperature, that particular container is ready to be placed in the upper section 36 and the confection dispensed therefrom upon demand.

The lower section 38 also houses refrigeration equipment including an evaporator structure 42 and a plurality of fans 44 that work in conjunction with the compressor and condenser structure housed within the base member 20 in the conventional manner as is known in the art. The fans 44 are operable to circulate relatively warmer air from the upper and lower sections 36, 38 of the dispensing cabinet 10 past the evaporator 42 and to circulate relatively colder air throughout the dispensing cabinet 10 as a result of the evaporators cooling effect. Temperature within the sections 36, 38 is preferably controlled by introducing electrical heat via resistance-type heating elements (not shown) in response to control signals provided by a proportional temperature controller (not shown), as is known in the art, to offset the cooling capacity of the refrigeration equipment and thus maintain the temperature within the upper and lower sections within a predetermined range, i.e. the dispensing or "soft serve" temperature. Naturally, any number of known equivalent temperature maintenance systems can be used without departing from the scope of the present invention.

For reasons of cleanliness, the upper section 36 is preferably separated by a dividing partition or wall 46 into front and rear regions 48 and 50. The rear region 50 houses a reversible motor 52, which preferably operates on standard 120 V, 60 Hz power, and a gear reduction unit 54. The front region 48 houses a dispensing pump means 56, which will be described hereafter.

A sliding rack 58, which is preferably enclosed by a flexible bellows 60, extends through an opening in the dividing wall 46 and operably connects the motor 52 to the dispensing pump means 56 via the gear reduction unit 54. FIG. 6 shows that the sliding rack 58 is movably mounted for reciprocating motion within a groove or channel 62 in a mounting block 64 beneath the motor 52 and provides a series of lengthwise extending teeth 66 which mesh with a pinion gear 68 provided by the gear reduction unit 54 (see FIG. 2). As the motor 52 is operated in a first mode or direction, the rack 58 is moved in a corresponding first direction by the pinion gear 68. Similarly, when the motor 52 is reversed to operate in a second mode or direction the rack 58 is moved in an opposite or second direction by the pinion gear 68. As such, the rack 58 and dispensing pump means 56, which are connected together as will be subsequently illustrated, are reciprocally operated.

Within the mounting block 64 are provided limit switches 70 and 72 which, as the rack 58 travels back-and-forth, sense the position of a notch 73 in the rack 58 and control the operation of the motor 52 accordingly. More specifically, position-relative signals provided by the limit switches 70 and 72 are used to control when the motor 52 is reversed to operate in the second mode or direction and to turn the motor off when a complete dispensing cycle has been completed. As the motor is operated in the first mode or direction, and the limit switch 70 engages the notch 73, the motor 52 will be reversed to operate in the second mode or direction. When the limit switch 72 engages the notch 73 the motor 52 will be turned off. By provision of additional notches in the rack, a number of different rack travel or stroke lengths, and a corresponding number of different volumes of dispensed frozen confection (i.e., 4 oz., 6 oz., 8 oz.), can be provided.

Alternatively, the limit switches 70, 72 could be replaced by an optical encoder which would count the number of revolutions of a motor shaft (not shown) or the pinion gear 68 and control the motor 52 such that a predetermined volume of material is dispensed. Other alternatives include a timer means which would measure the time period of motor operation in each direction corresponding to a predetermined volume of dispensed material or a stepper motor under microprocessor control which would track and control the position of a pump piston and, therefore, the volume of dispensed material. Other equivalent control means and methods could also be provided without departing from the scope of the present invention.

With continuing reference to FIG. 2, and also to FIGS. 3–8, a terminal end 74 of the rack 58 is pinned or otherwise attached to a connector 76 which releasably receives a piston rod 78 provided by the dispensing pump means 56. In the illustrated and preferred embodiment a spring clip 80 releasably attaches the piston rod 78 to the connector 76 to aid in quick assembly and disassembly of the dispensing pump means 56 for cleaning or maintenance. Any number of equivalent attachment means can be substituted for this arrangement without departing from the scope of the present invention.

The dispensing pump means 56 comprises a dispensing pump 82 and delivery means 84. Although two such dispensing pump means 56 are contained within the cabinet 10 of the illustrated and preferred embodiment, it is anticipated that the size and number of dispensing pumps 82, delivery means 84, and containers 40 will vary depending upon the anticipated volume of frozen confection to be served, and the number of flavors or types of confections desired to be dispensed at any given time.

Figure 5:
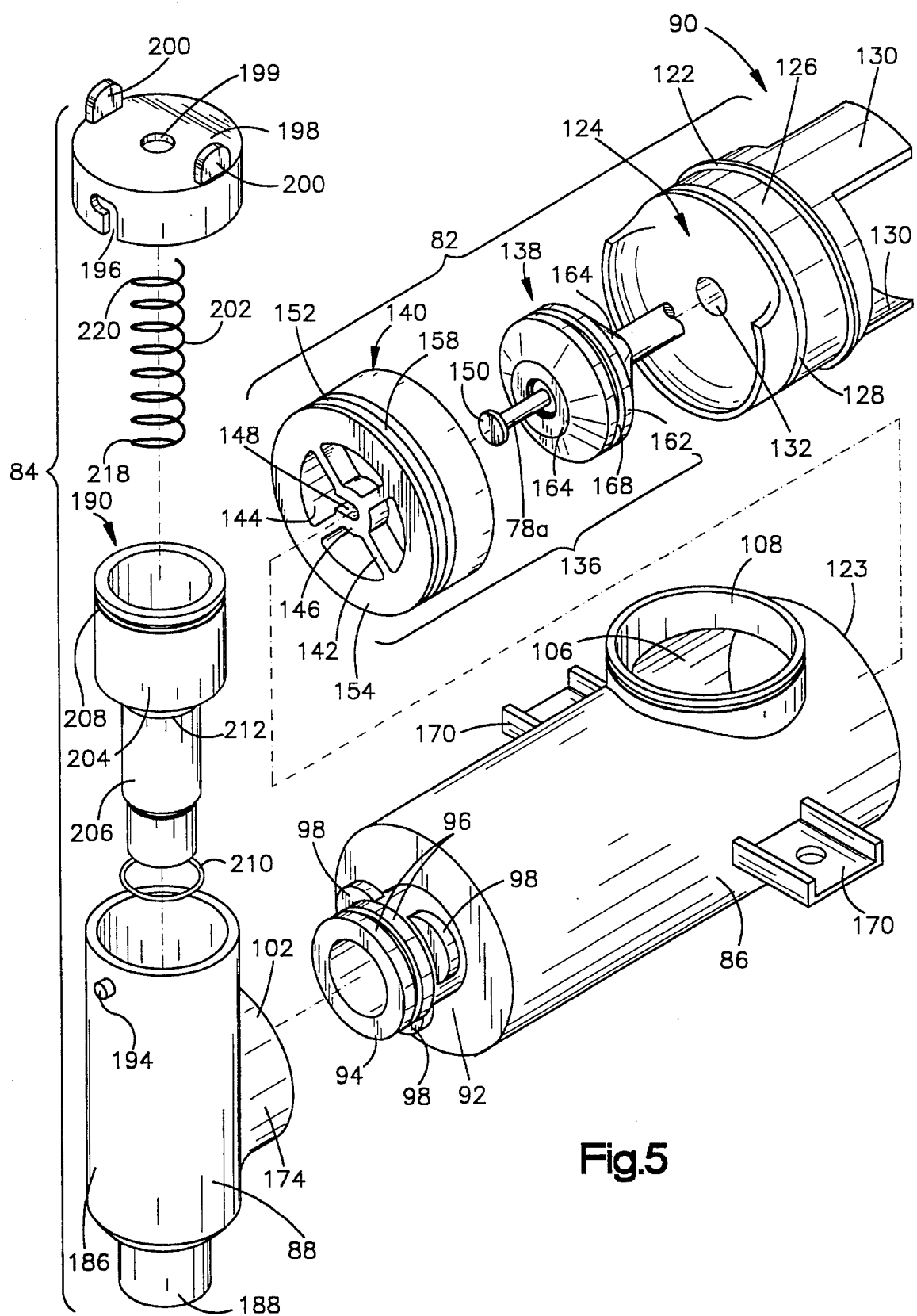
FIG. 5 is a front exploded perspective view of the pump and dispensing valve.

The dispensing pump 82 provides a conduit member or pump cylinder 86 and the delivery means 84 provides a discharge cylinder 88. The conduit member 86 and discharge cylinder 88 are removably connected to one another by connector means 89, as will be described more fully hereafter. The conduit member 86 serially connects the container 40 and the delivery means 84 and has a first or rear end which is closed by a removable plug-like end wall member 90 and an opposite front or second end having an integral end wall 92. A cylindrical outlet spout or male connection 94 projects outwardly from the second end of the conduit member 86 and provides a pair of annular, axially spaced apart ribs 96 and a series of radially extending mounting tabs 98 (FIGS. 5 and 8). The annular ribs 96 define a groove therebetween for receipt of an O-ring 100, while the tabs 98 are adapted to be received by an inlet or female mounting portion 102 of the discharge cylinder 88 in a twist-and-lock fashion, as will be apparent from the discussion to follow. The outlet spout 94, which defines a conduit member outlet port 104, and the conduit member 86 are generally coaxial, with the outlet spout 94 having a smaller diameter than the conduit member 86.

Near the rear or first end of the conduit member 86 is provided an inlet port 106. The inlet port 106 includes an upwardly extending inlet spout 108 with which the container 40 communicates. In the preferred embodiment, a container adapter and mounting member 110 is provided to secure and support the container 40 on the inlet spout 108 of the conduit member 86.

Figure 3:
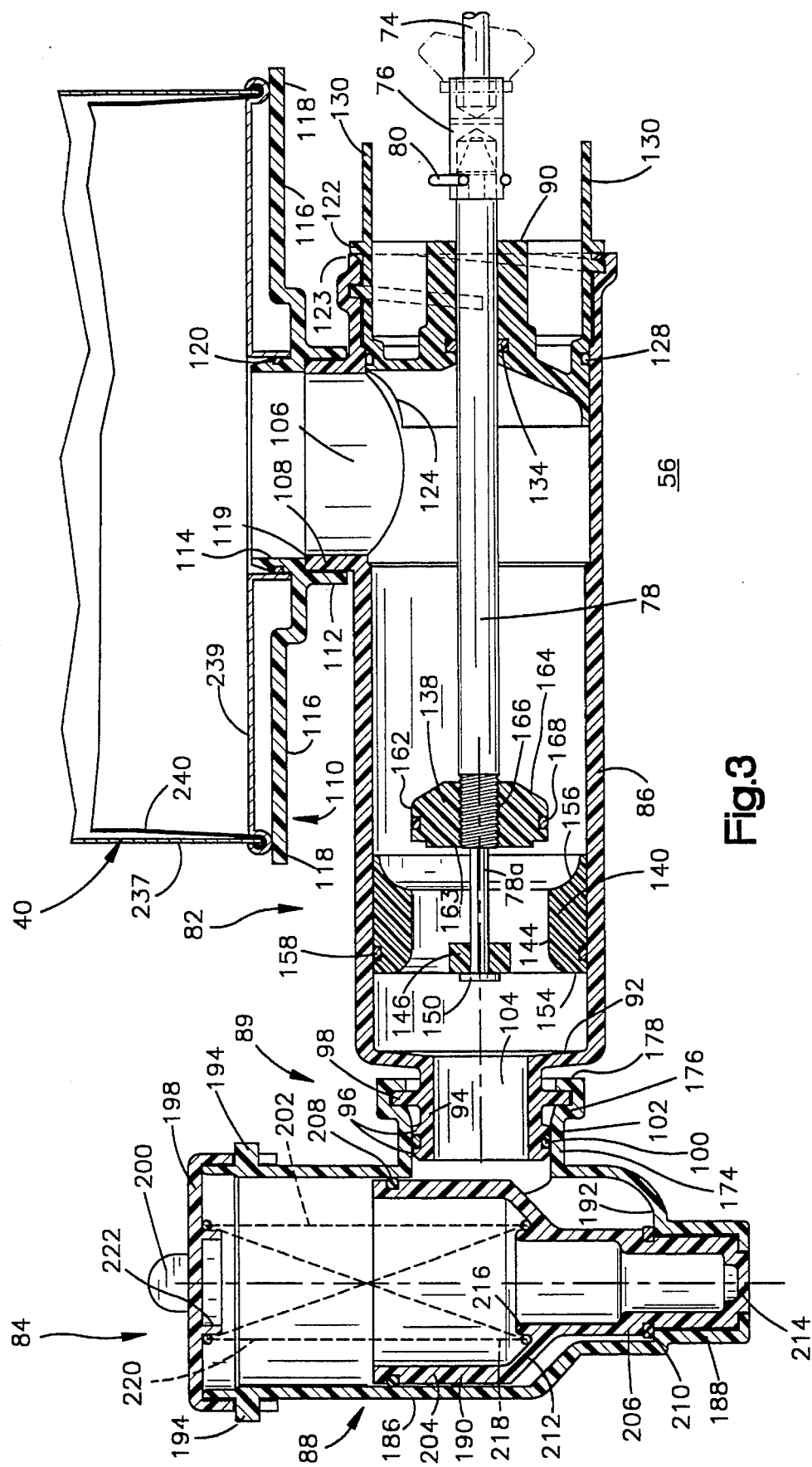
FIG. 3 is a side elevational view, in cross-section, of a dispensing pump, a portable container and a delivery means in accordance with the present invention.

As is best shown in FIG. 3, the adapter member 110 provides a downwardly extending, centrally located, cylindrical member 112 which receives the inlet spout 108, an upwardly extending cylindrical member 114 which projects into a lower end of the container 40, and a ring shaped body member 116. An outer peripheral portion 118 of the body member 116 receives and vertically supports a lower peripheral edge of the container 40, as illustrated.

The inlet spout 108 abuts an annular surface or stop 119 of the adapter 110 to limit insertion or travel of the spout 108 into the downwardly extending cylindrical member 112. Preferably, the downwardly extending cylindrical member 112 of the adapter 110 is permanently attached to the inlet spout 108 by adhesives, ultrasonic welding, or the like. Alternatively, the adapter member 110 could be integrally formed with the conduit member 86. Further, the adapter 110 can be removably secured to the inlet spout 108 by a threaded connection or other means to allow the adapter member 110 to be replaced by another adapter member designed to receive a different container having, for example, a larger or smaller diameter than the illustrated container 40.

The upwardly extending cylindrical member 114 is preferably resilient and radially deformed inwardly as it is received by the container 40 to seal the engagement therebetween in a fluid-tight manner. An annular rib 120 is provided on the outer surface of the upwardly extending cylindrical member 114 to further seal the adapter member 110 on the container 40. Alternatively, the upwardly extending cylindrical member 114 could be formed of a more radially stiff material and provided with an O-ring or other appropriate sealing means to sealably secure the container 40 to the adapter 110. Also, the container 40 could provided a threaded spout which could be threadably received by the upwardly extending cylindrical member 114 having mating threads.

From the foregoing it should be clear that the adapter member 110 described herein is specially designed for receipt of the preferred and illustrated container 40. Since the dispensing pump means 56 is adapted for use with various types of containers, some of which are illustrated hereinafter in FIGS. 9A–9C, the present invention is not to be limited to the specific adapter member 110 or container 40 disclosed herein. Rather, it is anticipated that the adapter member 110 will be interchangeable with various other equivalent adapter members for supporting and mounting various other containers.

Adjacent the inlet port 106, the rear or first end of the conduit member 86 provides a groove for threadably receiving threads 122 provided by the end wall member 90 to releasably secure the end wall member 90 thereto. The threads 122 engage an annular terminal or outer surface 123 of the conduit member 86 to limit insertion or travel of the end wall member 90 into the conduit member (see FIGS. 3 and 5). The end wall member 90 is generally cylindrical, and has a cut-away top portion 124 which aligns with the inlet port 106 when the threads 122 engage the outer surface 123 of the conduit member 86 to thereby allow viscous material to be freely introduced into the conduit member 86, as illustrated in FIGS. 3 and 5. The end wall member 90 has a cylindrical outer surface 126 which, with the aid of an O-ring 128, sealingly engages the inner circumference of the conduit member 86 adjacent the inlet port 106, as illustrated. A pair of gripping tabs 130 extend from the end wall member 90 to allow a user to rotate the end wall member 90 for installation and removal thereof.

A central circular hole 132 (FIG. 5) is provided in the end wall member 90 through which the piston rod 78 slidably extends. A circular groove surrounds the circular hole 132 and receives an O-ring 134 which slidably seals the engagement of the end wall member 90 and the piston rod 78. Thus, the end wall member 90 seals the rear or first end of the conduit member 86 while allowing the piston rod 78 to move reciprocally and axially relative to the conduit member 86. While the preferred end wall member 90 is illustrated in the drawings and described hereinabove, it should be clear that various other means could be substituted for the illustrated end wall member 90 without departing from the scope of the present invention.

The dispensing pump 82 comprises an assembly including a pump member or valved piston 136 (see FIG. 5) in addition to the piston rod 78, conduit member 86 and the end wall member 90. The piston 136 has coaxial inner and outer piston members 138 and 140 which are axially movable along the piston rod 78 relative to one another in a telescoping manner. As will be described more fully hereafter, there is lost motion between the inner and outer piston members 138, 140 to allow the inner piston member 138 to move relative to the outer piston member 140 during operation of the dispensing pump 82.

The outer piston member 140 includes a series of arms 142 that extend radially inwardly from an inner annular surface 144 to a central hub 146 (see FIG. 5). A flow path for viscous material is defined by the hollow or open area between the hub 146, arms 142, and inner annular surface 144. The hub 146 is formed of a resilient plastic and defines a slot-like snap-on, snap-off, U-shaped opening 148 for releasably receiving a reduced diameter portion or extension 78a of the piston rod 78. Preferably, the open end of the U-shaped opening 148 is slightly smaller than the diameter of the piston rod 78, causing the arms of the "U" to outwardly deform and releasably snap the piston rod 78 into place during assembly. Snap-fitting the outer piston member 140 on the reduced diameter portion 78a of the piston rod 78 facilitates assembly and disassembly of the dispensing pump means 56 for cleaning. The reduced diameter portion 78a of the piston rod 78 provides a terminal knob or button 150 to retain the outer piston member 140 thereon. The knob or button 150 is sized to allow its insertion between the arms 142 during assembly of the piston rod 78 on the outer piston member 140.

The outer piston member 140 also provides an outer cylindrical surface 152 and forward and rearward facing annular surfaces 154 and 156 (see FIG. 3). The rearward facing annular surface 156 is radially contoured or beveled, as illustrated, to direct or funnel viscous material into the hollow interior portion of the outer piston member 140. The forward annular surface 154 is generally planar. The outer cylindrical surface 152 is designed to slide adjacent the inner surface of the conduit member 86. A relatively forward end of the outer cylindrical surface 152 provides an annular groove for receipt of an O-ring 158 which seals the interface between the outer piston member 140 and the conduit member 86. More specifically, the O-ring 158 slidably and sealably engages the inner surface of the conduit member 86.

The inner piston member 138 has an outer cylindrical surface 162, forward and rearward-facing surfaces 163, 164, and a centrally located threaded bore 166. The threaded bore 166 allows the inner piston member 138 to be threadably and removably secured to the piston rod 78. The outer cylindrical surface 162, which slidably mates with the inner annular surface 144 of the outer piston member 140, has formed therein an annular or circumferential groove for receipt of an O-ring 168 which seals the engagement of the outer cylindrical surface 162 with the inner annular surface 144 of the outer piston member 140. As will be described more fully with regard to operation of the dispensing pump 82, when the inner piston member 138 moves into sealing engagement with the outer piston member 140 there is, in accordance with the present invention, a shearing action between the mating surfaces provided by the inner annular surface 144 of the outer piston member 140 and the outer cylindrical surface 162 of the inner piston member 138. The shearing action or interface area created at the mating surfaces helps to remove or shear particulate material, such as nuts and fruit, from the area of sealing engagement between inner and outer piston members 138 and 140, thereby insuring sealing engagement between the inner and outer piston members.

Thus, the inner piston member 138 is fixed to the piston rod 78 and cannot move relative thereto during operation of the dispensing pump 82 while the outer piston member 140 is removably and slidably secured to the piston rod 78 and has a limited range of axial motion relative to the inner piston member 138. In the illustrated embodiment, movement of the inner piston member 138 relative to the outer piston member 140 (i.e., the lost motion) is limited to the distance between the button or knob 150 on the piston rod 78 and the forward facing surface 163 of the inner piston member 138, less the thickness of the hub 146.

The dispensing pump 82 is assembled outside of the conduit member 86 by snap fitting the reduced diameter portion 78a of the piston rod 78, which already has the inner piston member 138 threadably secured thereto, to the hub 146 of the outer piston member 140. The piston 136 is inserted into the rear or first end of the conduit member 86 and the end wall member 90 is pushed onto the piston rod 78 and threadably secured to the conduit member 86.

The dispensing pump 82 is placed in the front region 48 (see FIG. 2) of the cabinet 10 such that the end of the piston rod 78 extends into the connector 76 and is attached, via the connector 76 and spring clip 80, to the rack 58 as discussed earlier. The conduit member 86 provides exterior mounting projections 170 (see FIG. 5) which are secured to a cabinet-provided support surface (not shown) by conventional fasteners such as thumb screws (not shown) to complete installation of the dispensing pump 82 within the cabinet 10.

With reference to FIGS. 3 and 7, the mounting portion 102 of the discharge cylinder 88 has a cylindrical body 174 including an outer end with inner and outer annular retaining walls 176, 178, a discontinuous clover-shaped annular groove 180, and a series of stop surfaces 182. The stop surfaces 182 are provided between the inner and outer retaining walls 176, 178, and form the discontinuities in the annular groove 180. Radial notches 184 are provided in the outer retaining wall 178 to receive the mounting tabs 98 of the conduit member outlet spout 94. During assembly, and with the conduit member 86 of the dispensing pump 82 fixed in position within the cabinet 10, the inlet or female mounting portion 102 of the discharge cylinder 88 is positioned relative to the male connection or outlet spout 94 such that the cylindrical body 174 slidably receives the male connection or outlet spout 94 and the mounting tabs 98 are received by the notches 184 in the outer retaining wall 178. Thereafter, the discharge cylinder 88 is rotated counterclockwise, causing the mounting tabs 98 to slide into the annular groove 180 between the inner and outer retaining walls 176, 178, with rotation being limited by the stop surfaces 182 such that the discharge cylinder 88 is generally vertically oriented, as illustrated. The O-ring 100 provided on the outlet spout 94 slidably engages the inner wall of the cylindrical body 174 to seal the union of the female mounting portion 102 and the male connection or outlet spout 94.

In addition to the inlet or mounting portion 102, the discharge cylinder 88 includes a hollow main body 186 and a reduced-diameter lower cylindrical extension or nozzle 188. The inlet or mounting portion 102 projects from the main body 186 and serves as a valve inlet port thereto. The main body 186 and nozzle 188 receive a piston-like poppet member 190 that is reciprocally movable within the discharge cylinder 88 and serves as a delivery valve for viscous material from the conduit member 86 toward and through an outlet provided at a lower end of the nozzle 188. A side of the main body 186 remote from the inlet or mounting portion 102 generally matches the shape of the poppet member 190 while a side proximate to the mounting portion 102 is scooped-out to allow viscous material to enter the discharge cylinder 88, as illustrated. An annular shoulder surface 192 surrounds an upper end of the nozzle 188 and serves as a seat against which the poppet member 190 seals.

The outer surface of the discharge cylinder 88 provides a pair of lugs or ears 194 which are adapted to be releasably received by slotted openings 196 (FIG. 5) in a cap 198 which is part of the delivery means 84. Although the cap 198 is preferably attached to the main body 186 with a bayonet-type connection as illustrated, it should be clear that threads or other suitable attachment means could be employed without departing from the scope of the present invention. The cap 198 includes projections 200 to facilitate user-rotation thereof during assembly and disassembly of the deliver means 84 for cleaning and maintenance and a vent hole 199 (FIG. 5).

The delivery means 84 includes a compression or coil-type biasing spring 202 in addition to the poppet member 190, discharge cylinder 88, and cap 198. The poppet member 190 is slidably received within the discharge cylinder 88 and provides an enlarged diameter upper portion 204 and a reduced diameter lower portion 206. The upper portion 204 provides an annular groove for receipt of an O-ring 208 which slidably seals against the inner surface of the main body 186 at a location upwardly spaced from the mounting portion 102 providing the valve inlet port. The lower portion 206 provides an annular groove within which an O-ring 210 is received, as illustrated. The O-ring 210 is provided to seal or seat against the annular shoulder surface 192 thereby closing the valve. A frustoconical transition surface 212 is provided intermediate the upper and lower portions 204 and 206 of the poppet member 190. The transition surface 212 serves as a surface against which the force of pressurized viscous material bears and forces the poppet member 190 upwardly, as will be described more fully hereafter.

The lower portion 206 of the poppet member 190 has a closed bottom end 214 (see FIG. 3) and is slidably received within the nozzle 188. As the poppet member 190 moves downwardly in the discharge cylinder 88, there is a shearing action between edge portions provided by an outer surface of the lower portion 206 of the poppet member 190 and the inner surface of the nozzle 188 to help remove particulate matter, such as nuts or fruit, from the nozzle 188.

The upper portion 204 of the poppet member 190 provides a cup shaped interior having an upstanding cylindrical member 216 which receives a lower end 218 of the spring 202. An upper end 220 of the spring 202 is received by a cylindrical member 222 which projects downwardly from the center of the cap 198.

The delivery means 84 is assembled by sliding the poppet member 190 downwardly into the discharge cylinder 88. Thereafter, the upper end 220 of the coil spring 202 is placed over the cylindrical member 222 of the cap 198, and the cap is placed over the open top end of main body 186 of the discharge cylinder 88 such that the lower end 218 of the spring 202 is received by the upstanding cylindrical member 216 of the poppet 190. The cap 198 is secured to the discharge cylinder 88 by pushing downwardly to compress the spring 202 and then rotating the cap 198 to allow the lugs 194 provided by the discharge cylinder 88 to be received within the slotted openings 196 of the cap 198. At this point the O-ring 210 on the lower portion 206 of the poppet member 190 is seated on the annular shoulder surface 192 due to the bias of the compressed spring 202 and the O-ring 208 of the upper member 204 is in sealing engagement with the inner surface of the main body 186 at a location upwardly spaced from the inlet port or mounting portion 102 as illustrated in FIG. 3. Thereafter the discharge cylinder 88 is attached to the conduit member 86 as described hereinbefore.

With the dispensing pump means 56 assembled and a container 40 of viscous material, such as frozen confection, placed and sealed upon the inlet spout 108, dispensing of viscous material is ready to begin. Initially, the conduit member 86 is charged or primed with viscous material from the container 40 by operating the dispensing pump means 56 through one or more cycles, as will be described hereafter, to introduce or fill the conduit member 86 with viscous material. As noted hereinbefore, positioning of the piston 136 within the conduit member 86 is controlled by the rack 58 and motor 52 in response to signals from the limit switches 70 and 72.

Figure 4A:
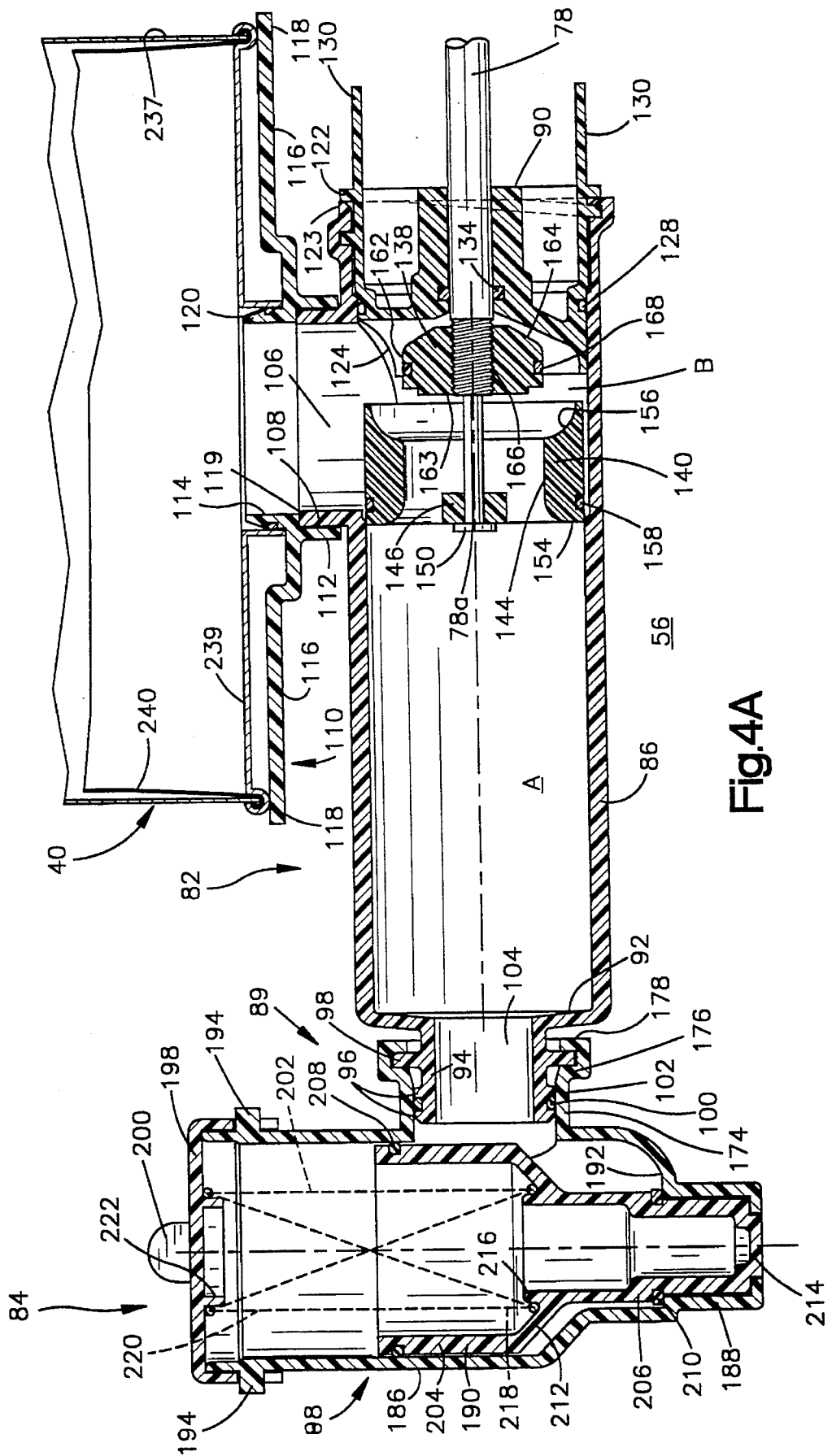
FIGS. 4A–4D show the dispensing pump and delivery means of FIG. 3 in various sequential operating conditions.
Figure 4B:
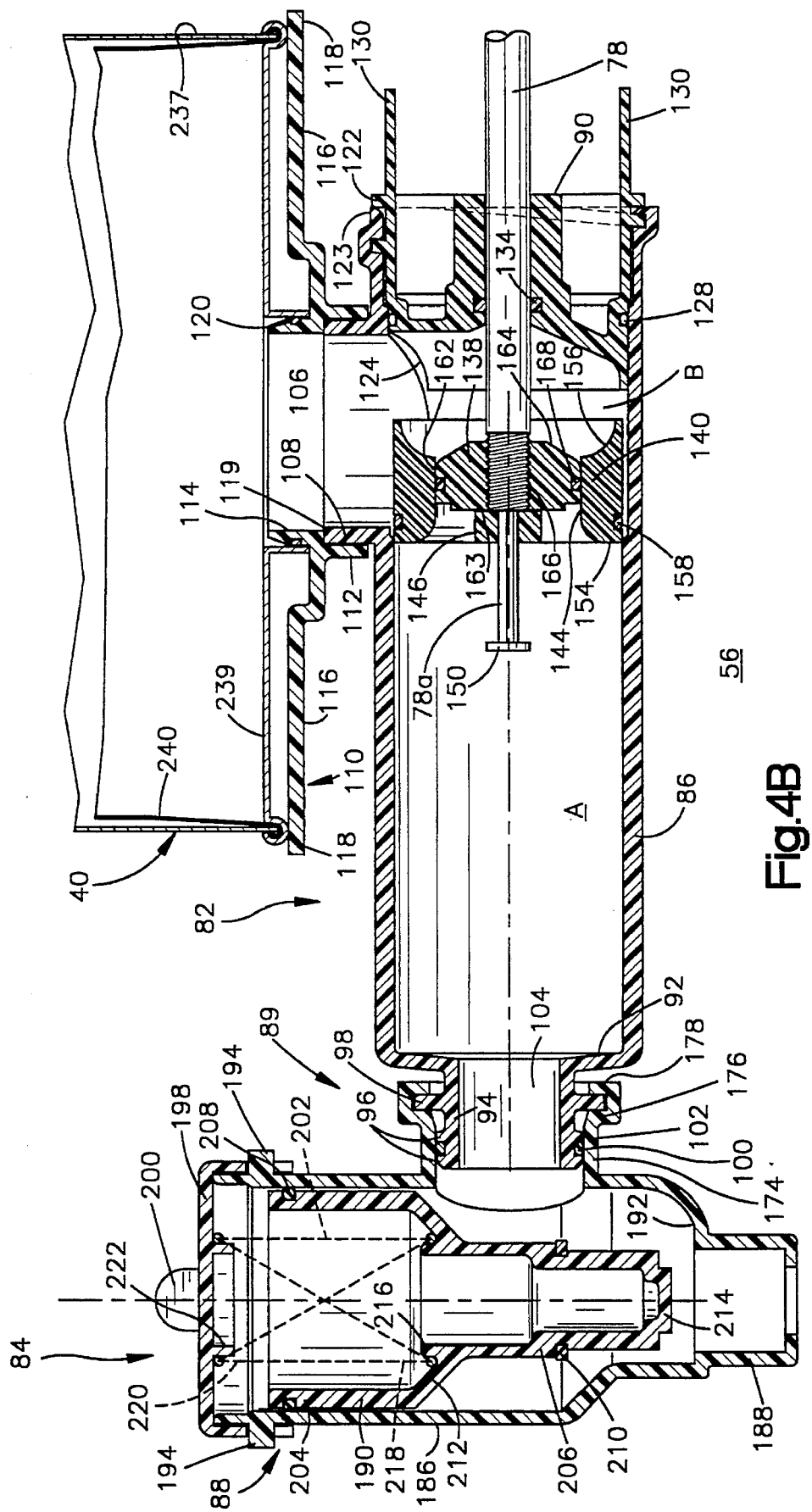

The dispensing pump means 56 is generally in the configuration shown in FIG. 4A at the start of a dispensing cycle wherein chambers A and B in front of and behind the piston 136, respectively, are fully charged with viscous material. Manipulation of the control devices or push buttons 32 (see FIG. 1) operates the motor 52 in a first mode or direction in which the pinion gear 68 drives the rack 58 and associated piston rod 78 leftwardly (as shown in FIG. 4A) through the conduit member 86. Since the outer piston member 140 is in sealing engagement with the conduit member 86 and is slidably mounted on the reduced diameter portion 78a of the piston rod 78, there is lost motion between the inner and outer piston members 138, 140, and the inner piston member 138 moves toward and into sealing engagement with the outer piston member 140 (FIG. 4B). As such, the inner and outer piston members 138 and 140 are in sealing engagement with each other and are prepared to move together down the conduit member 86 toward the integral end wall 92.

As the piston 136 moves along the inner surface of the conduit member 86, the viscous material in region A in front of the piston 136 is pressurized and therefore pushed or pumped toward the outlet port 104 while a vacuum or low pressure condition is simultaneously developed in region B behind the piston 136. The vacuum or low pressure condition created in the conduit member 86 suctions or evacuates viscous material from the container 40 into region B behind the piston 136.

The pushed or pumped viscous material flows through the outlet port 104 and into the main body 186 of the discharge cylinder 88, below the transition surface 212 of the poppet member 190. The pressurized or pumped viscous material provided by movement of the piston 136 bears against the transition surface 212 and forces the poppet member 190 to move upwardly against the bias of the spring 202, thereby unseating the O-ring 210 from the shoulder surface 192 and thus allowing viscous material within the discharge cylinder 88 to be dispensed from the cylindrical extension or nozzle 188.

Figure 4C:
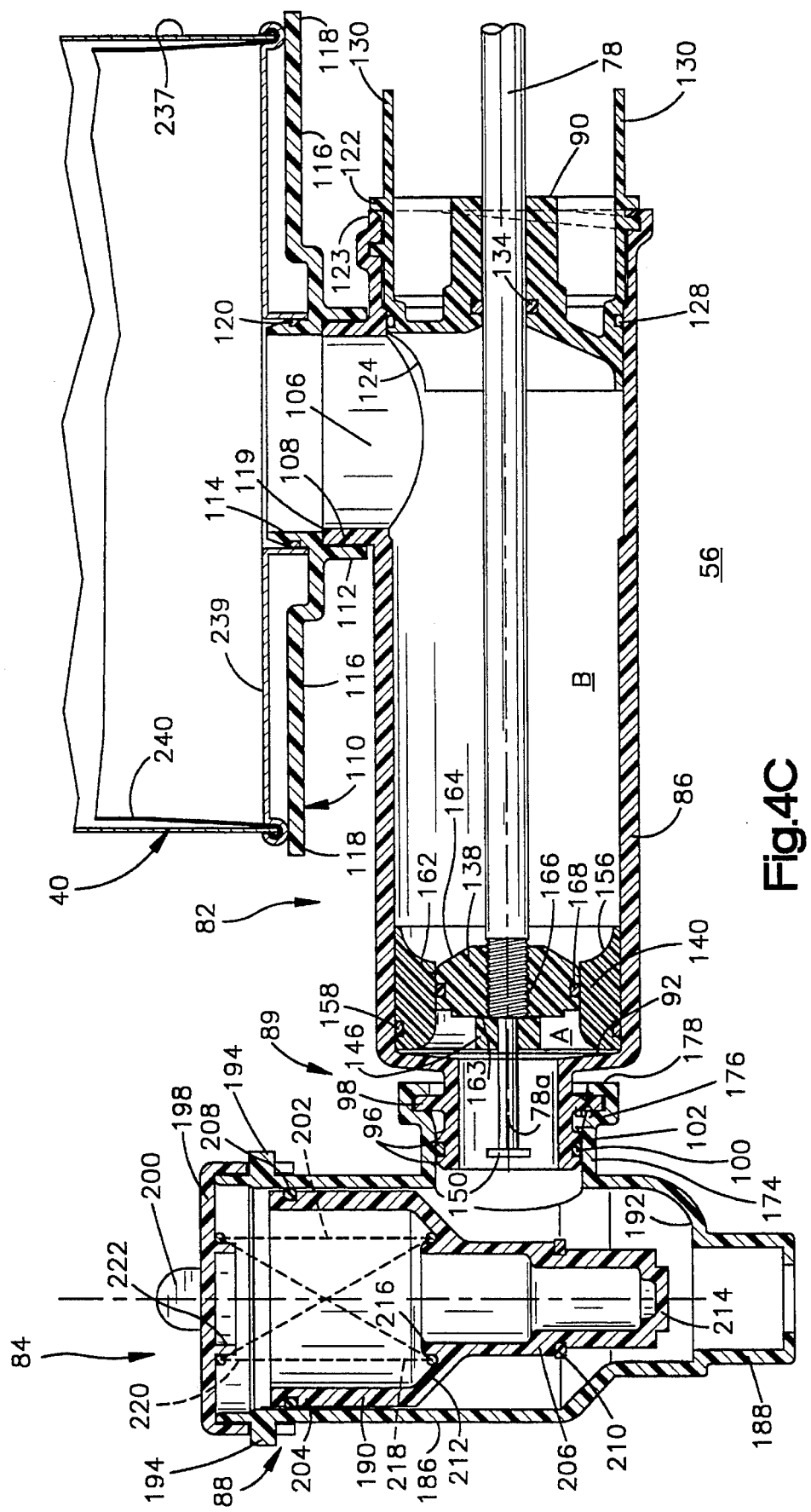

At the end of a discharging or dispensing stroke, the dispensing pump means 56 is generally positioned as shown in FIG. 4C. Although the piston 136 is no longer pushing or pumping viscous material out of the nozzle 188, the poppet member 190 of the delivery means 56 does not return to its sealing position because the spring bias of the spring 202 is preferably not strong enough to force the viscous material remaining within the discharge cylinder 88 out of the nozzle 188. Naturally, the spring strength could be chosen such that the spring 202 would force the poppet member 190 to seat on the shoulder surface 192 at the end of the discharge stroke.

However, increasing the spring strength would also increase the pressure necessary to overcome the spring bias and unseat the poppet member 190 from the shoulder surface 192 during the discharge stroke and would correspondingly increase the energy required to dispense viscous material from the region A toward an amount comparable to the energy expended in suctioning or evacuating viscous material out of the container 40 and into region B. In the preferred and illustrated embodiment it is desired that the energy required to push or pump the viscous material from region A out of nozzle 188 be relatively small or minimal as compared with the energy expended in suctioning or evacuating viscous material out of the container 40 and into region B of the conduit member 86. Moreover, increasing the spring strength may result in an unwanted high velocity burst or discharge of viscous material from the nozzle 188. Also, if a higher strength spring is employed, the poppet member 190 may only move upwardly relative to the shoulder surface 192 a short distance and therefore act as a strainer to restrict or prevent dispensing of solid particulates, such as nuts and fruit, through the nozzle 188. Furthermore, the use of a higher strength spring will result in additional compression or pressurization of the viscous material to be dispensed, which may lead to undesirable ice crystal formation, as discussed earlier.

As the motor 52 is reversed to operate in a second mode or reverse direction due to signals from the limit switch 70, the outer piston member 140 remains stationary due to its sealing engagement with the conduit member 86 and the slidable mounting of the outer piston member 140 on the reduced diameter portion 78a of the piston rod while the inner piston member 138 moves rearwardly relative to the outer piston member 140. As the inner piston member 138 moves rearwardly relative to the outer piston member 140, the O-ring 168 slides across the inner annular surface 144 of the outer piston member 140 and produces a vacuum or reduced pressure condition in region A and discharge cylinder 88. The transient vacuum or suction force thus created tends to draw a small amount viscous material within the cylindrical extension or nozzle 188 back into the main body 186 and cooperates with the spring 202 to return the poppet member 190 to the sealing or seated condition illustrated in FIG. 4D.

Figure 4D:
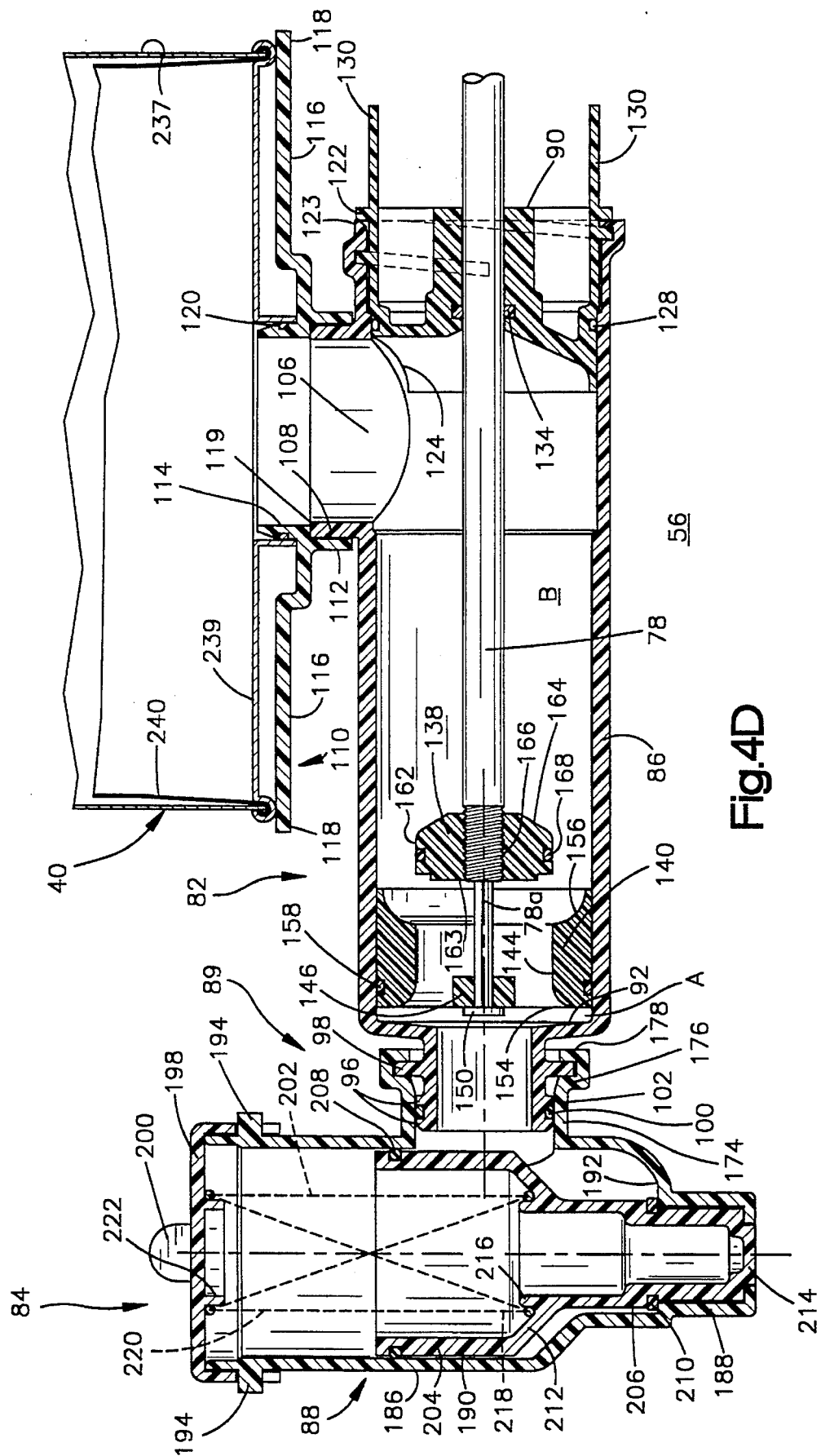

Further rearward movement of the piston rod 78 causes the piston 136 to be configured as shown in FIG. 4D wherein the inner and outer piston members 138 and 140 are spaced from each other and the terminal knob or button 150 is in contact with the hub 146 and forces the outer piston member 140 to move rearwardly with the piston rod 78 and inner piston member 138. As the piston 136 is pulled through the viscous material which had previously been drawn or suctioned into region B by the piston 136 during the discharge or dispensing stroke, the inwardly-directed contour of the rearward annular surface 156 funnels or directs viscous material into the open interior of the outer piston member 140 wherein it flows past the arms 142 and hub 146 and into region A at the forward side of the piston 136. As such, the inner piston member 138 acts as a valve mechanism to allow the piston 136 to pass through the viscous material without causing substantial movement of the viscous material through the conduit member 86 in the rearward direction. Movement of the viscous material past the inner piston member 138 and through the outer piston member 140 homogenizes or stirs the viscous material, so as to enhance the consistency and texture of the dispensed product. When the piston 136 reaches the terminal position illustrated in FIG. 4A at the completion of a dispensing cycle, the limit switch 72 engages the notch 73 and turns the motor 52 off (see FIG. 6).

As the dispensing pump means 56 is operated through each of a number of dispensing cycles, viscous material is dispensed upon demand from the container 40 and the container collapses or otherwise deforms and thereby, in effect, reduces its internal volume available for holding viscous material. The container illustrated in FIGS. 2–4D provides a cylindrical outer wall 237, rigid fixed top and bottom end walls 238, 239 and an inner flexible bag 240, The cylindrical outer wall is preferably formed of card board or the like while the end walls 238, 239 are preferably formed of plastic or stainless steel. The bag 240, which is preferably formed of a flexible plastic, is preferably secured at a midpoint thereof to the interior of the cylindrical outer wall 237 to help insure that the bag 240 properly collapses toward the inlet spout 108 during evacuation of viscous material from the container 40. The closed end of the flexible bag 240 has secured thereto a stiff or rigid disc 241, preferably of plastic, which moves downwardly with the bag 240 as viscous material is evacuated therefrom and prevents the closed end of the bag 240 from being suctioned into the inlet spout 108 by operation of the dispensing pump 82. The open end of the bag 240 is crimped together with the bottom end wall 239 to the lower edge of the cylindrical outer wall 237, as illustrated best in FIGS. 3–4D. Naturally, other means of sealably connecting the bag 240 to the bottom end wall 239 and the outer wall 237 are known in the art and could be employed.

Figure 9A:
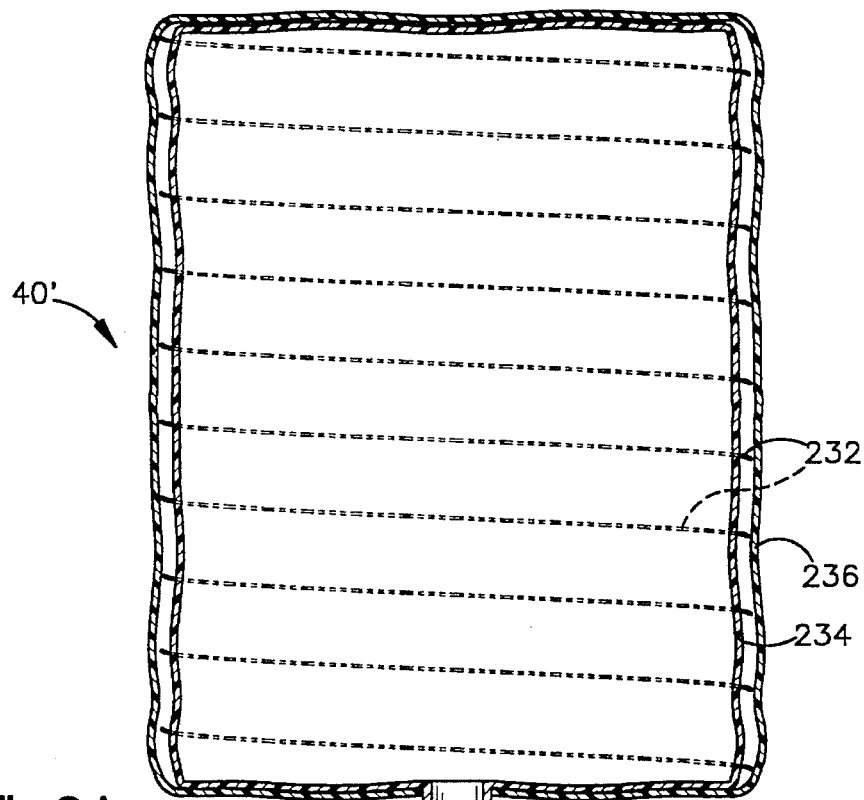
FIG. 9A is a front elevational view of an alternative portable container according to the present invention.
Figure 9B:
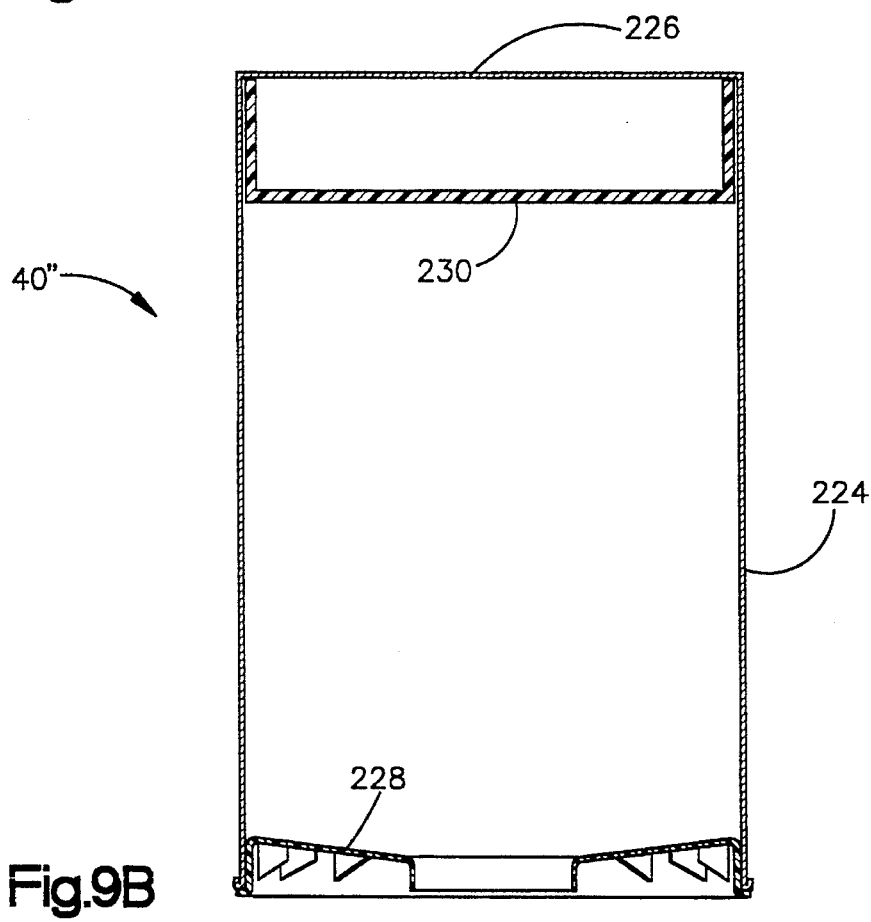
FIG. 9B is a front elevational view of another alternative portable container according to the present invention.

Alternatively, with reference to FIG. 9A, a container 40' which comprises a coiled wire or spring member 232 trapped between inner and outer cylindrical plastic layers 234, 236, could be used in place of the container 40. One or more turns of coiled wire is provided at the top and bottom ends of the container 40' to help stiffen the ends. Another alternative container 40''' is shown in FIG. 9B provides a rigid cylindrical outer wall 224, rigid top and bottom fixed end walls 226 and 228, and an axially movable piston 230. The piston 230 is generally disc-shaped and is located above the viscous material to be dispensed and moves downwardly with the material as it is drawn or suctioned toward the inlet spout 108 by operation of the dispensing pump means 56. For a more detailed description of the container 40, see U.S. Pat. No. 5,244,277, which has previously been incorporated herein by reference. A third alternative container 40''' is shown in FIG. 9C wherein the container is of the collapsible bellows type having a series of pleated folds 244 to allow the container 40''' to collapse toward the inlet spout 108. For a more detailed description of the container 40''' illustrated in FIG. 9C, see U.S. Pat. No. 5,215,222, which has been previously incorporated herein by reference.

It should be understood that the term "collapsible container" as used herein is intended to refer to containers wherein the available volume for viscous material storage is reduced as viscous material is dispensed from the container. As such, the term "collapsible container" shall have its broadest possible meaning and includes containers which have deformable sidewalls or axially movable pistons or ends walls, as disclosed in the above-noted patents, and any equivalent containers which deform, are reconfigured, or change shape to alter the internal volume available for storage of viscous material as viscous material is dispensed therefrom.

When viscous material will not be dispensed for a period of time, such as at the end of the working day, it is desirable to remove the delivery means 84 from the dispensing pump 82. The delivery means 84 is removed or unattached from the dispensing pump by rotating the discharge cylinder 88 clockwise to align the mounting tabs 98 of the male connection or outlet spout 94 with the notched openings 184 in the outer retaining wall 178 of the inlet or female mounting portion 102, and pulling the discharge cylinder 88 away from the dispensing pump 82. Thereafter, a valved or vented cap (not shown) can be placed on the male connection or outlet spout 94. The cap can be a plug which is inserted into the outlet spout 94 and which will allow viscous material to flow therethrough if the pump is unintentionally or accidentally operated without the dispensing means 84. The provision of a valved or vented cap would prevent damage to the dispensing pump means due to an overload or overpressure being developed within the conduit member 86. Since there are several structures for providing this function known in the art, and since the cap does not form a part of the present invention, no specific structure for the cap has been illustrated in the present application.

Once the cap is installed on the outlet spout 94, the viscous material within the conduit member 86 is isolated from atmosphere and foreign material is prevented from being introduced into the conduit member 86 via the outlet spout 94. If desired, the container 40 and dispensing pump 82 can be removed from the cabinet 10 and placed in storage until further dispensing is desired. Otherwise, the container 40 and dispensing pump 82 can remain within the dispensing cabinet 10 until the next time dispensing is desired, at which point a clean delivery means 84 can be reattached to the conduit member 86 via the connector means 89, as described earlier. By providing a removable delivery means 84, only the portion of the viscous material which is contained within the delivery means 84 must be discarded at the end of the working day, the viscous material within the conduit member 86 being retained for dispensing at a later time. Moreover, only the delivery means 84 must be disassembled for cleaning at the end of the working day. This represents an improvement in the art wherein a greater volume of viscous material must be discarded or wasted when the dispenser is not to be operated for a period of time and wherein the entire pump must be disassembled and cleaned at the end of each working day.

It should be further understood that the electric motor 52 described herein to drive the dispensing pump means 56 can be replaced by an type of power-operated means (i.e., non-manual), such as hydraulic or pneumatic drive means, and the like. Therefore, the term "motor driven" used in the claims appended hereto shall be given its broadest possible scope, and shall not be limited to the electric motor described hereinbefore. Furthermore, the inventors contemplate that the dispensing pump means could be non-motor driven, i.e., that it could be adapted for manual operation.

While the preferred embodiment of the present invention is shown and described herein, it is to be understood that the same is not so limited but shall cover and include any and all modifications thereof which fall within the purview of the invention. For example, while preferred, the dispensing cabinet 10 need not include a tempering cabinet. Also, although an automatic poppet-type valve is disclosed as part of the delivery means of the present invention, it is clear that other types of manual or automatic valves could be employed without departing from the scope and spirit of the invention as defined by the claims appended hereto. Moreover, several equivalent types of containers can be used with the dispensing pump means 56 of the present invention. Likewise, the sealing O-rings described herein are interchangeable with other suitable sealing means. It is also contemplated that the conduit member 86 and discharge cylinder 88 could be integrally formed as a single unit and that the portable containers described herein could be replaced by a refillable viscous material receiving hopper or receptacle or other non-portable container. Therefore, the scope of the present invention is not to be limited to the preferred embodiment illustrated herein, but is rather only defined by the claims appended hereto.

What is claimed is:

1. A dispenser for viscous material comprising:

a temperature controlled compartment;

a supply source of said viscous material located within said temperature controlled compartment, said supply source being constituted by a container for storing said viscous material;

a delivery means for discharging said viscous material; and a pump means within said temperature controlled compartment and connected between said supply source and said delivery means to establish fluid communication therebetween, said pump means having a pump member movable in two directions, said pump member when moving in a first of said two directions pressurizing said viscous material to thereby push the material toward said delivery means for discharge thereof while simultaneously extracting material by means of suction from said supply source, said pump member including valve means to allow the pump member to move in a second of said two directions without causing substantial movement of said viscous material.

2. A dispenser according to claim 1 wherein said container has an internal material storage volume that is reduced as material is extracted from said container by said suction.

3. A dispenser according to claim 2 wherein said container is a portable, prefilled container.

4. A dispenser according to claim 1 wherein said delivery means includes a valve, said valve being normally-closed and being opened in response to the force of said pressurized viscous material, thereby allowing said discharging via said opened valve.

5. A dispenser according to claim 4 wherein said valve includes a spring member biasing the valve toward a normally closed position, said opened valve being closed by means of said spring member and by a transient suction force applied to said valve as said pump member begins to move in the second of said two directions whereby said discharging through said valve is terminated.

6. A dispenser for viscous material comprising:
a supply source of said viscous material, said supply source being constituted by a container for storing said viscous material;
a delivery means for discharging said viscous material; and
a pump means connected between said supply source and said delivery means to establish fluid communication therebetween, said pump means having a motor driven pump member movable in two directions, said pump member when moving in a first of said two directions pressurizing said viscous material to thereby push the material toward said delivery means for discharge thereof while simultaneously extracting material by means of suction from said supply source, said pump member including valve means to allow the pump member to move in a second of said two directions without causing substantial movement of said viscous material.

7. A dispenser for viscous material comprising:
a supply source of said viscous material, said supply source being constituted by a portable container for storing said viscous material;
a delivery means for discharging said viscous material;
a conduit member connected to establish fluid communication between said supply source and said delivery means, said viscous material being movable from said supply source to said delivery means via said conduit member; and
pump means having a motor driven pump member movable in two directions, said pump member, when moving in a first of said two directions, pressurizing said viscous material to thereby push the material through said conduit member toward said delivery means while simultaneously extracting viscous material by means of suction from said supply source into said conduit member, said pump member including valve means to allow the pump member to move in a second of said two directions without causing substantial movement through said conduit of said extracted viscous material.

8. A dispenser according to claim 7 wherein said conduit member provides a cylindrical chamber and said pump member includes a piston located in said chamber for reciprocating movement therein.

9. A dispenser according to claim 8 wherein said piston includes a valve mechanism allowing said piston to pass through said extracted viscous material in the second of said two directions without causing substantial movement of said extracted viscous material.

10. A dispenser according to claim 9, wherein said piston includes inner and outer piston members, said outer piston member being in sliding and sealing engagement with the conduit member and said piston members being movable relative to each other between a sealed position and an unsealed position.

11. A dispenser according to claim 10, wherein said inner and outer piston members provide mating surfaces which slidingly and sealingly engage one another to produce a shearing action when moved relative to one another to prevent particulate material from remaining between the inner and outer piston members at said mating surfaces.

12. A dispenser according to claim 11, wherein when said piston is moved in the second of said two directions, said extracted viscous material flows around the inner piston member and through the outer piston member.

13. A dispenser for viscous material comprising:
a supply source for storing and containing said viscous material;
a delivery means for discharging said viscous material in units of predetermined volumes;
a conduit member in fluid communication with, and serially connected between, said supply source and said delivery means, said viscous material being movable from said supply source to said delivery means via said conduit member;
reciprocating motor driven pump means having a pump member movable in two directions, said pump member being located within said conduit member, said pump member, when moving in a first of said two directions, moving said material through said conduit member by pressurizing said material thereby pushing said material towards said delivery means for discharge thereof, while simultaneously extracting said material by means of suction from said supply source, said pump member including valve means to allow the pump member, when moving in a second of said two directions, to pass through the viscous material extracted from said supply source without causing substantial movement through said conduit of the said extracted viscous material; and
control means for determining the degree of movement of said pump member within said conduit to thereby predetermine the swept volume of the conduit member and thus the amount of material discharged by the delivery means.

14. A dispenser according to claim 13 wherein the control means can be adjusted to vary the amount of said discharged material.

15. A dispenser for viscous material comprising:
a supply source of said viscous material, said supply source being constituted by a container for storing said viscous material;
a delivery means for discharging said viscous material;
a pump means connected between said supply source and said delivery means to establish fluid communication therebetween, said pump means having a motor driven pump member movable in two directions, said pump member when moving in a first of said two directions pressurizing said viscous material to thereby push the material toward said delivery means for discharge thereof while simultaneously extracting material by means of suction from said supply source, said pump member including a valve means to allow said pump member to move in a second of said two directions without causing substantial movement of said viscous material toward either said delivery means or said supply source; and means for removably connecting the delivery means to the pump means.

16. A dispenser according to claim 15 wherein the delivery means comprises a mounting portion and the pump means comprises a conduit member having an outlet spout, said connecting means being provided by said mounting portion and said outlet spout.

17. A dispenser according to claim 16 wherein the mounting portion provides an annular groove which receives a series of radial mounting tabs provided by the outlet spout.

18. A dispenser according to claim 17 wherein the mounting portion includes a series of stop surfaces which limit rotation of the mounting tabs within the annular groove.

* * * * *